(12) United States Patent
Fukuba et al.

(10) Patent No.: US 11,216,952 B2
(45) Date of Patent: Jan. 4, 2022

(54) REGION EXTRACTION APPARATUS AND REGION EXTRACTION METHOD

(71) Applicant: MITSUBISHI HEAVY INDUSTRIES, LTD., Tokyo (JP)

(72) Inventors: Shinsuke Fukuba, Tokyo (JP); Yuki Uchiyama, Tokyo (JP); Takuya Koyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/966,605

(22) PCT Filed: Jan. 11, 2019

(86) PCT No.: PCT/JP2019/000619
§ 371 (c)(1),
(2) Date: Jul. 31, 2020

(87) PCT Pub. No.: WO2019/187494
PCT Pub. Date: Oct. 3, 2019

(65) Prior Publication Data
US 2021/0056707 A1 Feb. 25, 2021

(30) Foreign Application Priority Data
Mar. 26, 2018 (JP) .............................. JP2018-057894

(51) Int. Cl.
*G06T 7/174* (2017.01)
*G06T 7/187* (2017.01)
(Continued)

(52) U.S. Cl.
CPC ............ *G06T 7/174* (2017.01); *G06K 9/6215* (2013.01); *G06K 9/6268* (2013.01); *G06T 7/11* (2017.01); *G06T 7/187* (2017.01)

(58) Field of Classification Search
CPC .. G06K 9/0063; G06K 9/6215; G06K 9/3233; G06K 9/6267; G06K 9/6268; G06T 7/11; G06T 7/187; G06T 7/174
See application file for complete search history.

(56) References Cited

U.S. PATENT DOCUMENTS 9,881,381 B2 * 1/2018 Kono ..................... G06T 7/0012
2010/0246946 A1 * 9/2010 Yamada ................. H04N 19/85
382/166
(Continued)

FOREIGN PATENT DOCUMENTS

| JP | 2017-033197 | 2/2017 |
| WO | 2010/061852 | 6/2010 |
| WO | 2015/151553 | 10/2015 |

OTHER PUBLICATIONS

International Search Report dated Apr. 2, 2019 in International (PCT) Application No. PCT/JP2019/000619.
(Continued)

*Primary Examiner* — Mia M Thomas
(74) *Attorney, Agent, or Firm* — Wenderoth, Lind & Ponack, L.L.P.

(57) ABSTRACT

A region extraction apparatus provided with a candidate extraction unit, a categorization unit and a region extraction unit. The candidate extraction unit extracts a difference region where a first ground surface image photographed from above at a first time point and a second ground surface image photographed at a second time point are different. The categorization unit estimates a first category of a first object photographed in correspondence with a position in the first ground surface image, calculates a first categorization image indicating a relationship between the position of the first object and the first category, estimates a second category of a second object photographed in correspondence with a position in the second ground surface image and calculates
(Continued)

a second categorization image indicating a relationship between the position of the second object and the second category. The region extraction unit extracts an extraction region from the difference region.

16 Claims, 15 Drawing Sheets

(51) Int. Cl.
   *G06T 7/11* (2017.01)
   *G06K 9/62* (2006.01)

(56) References Cited

U.S. PATENT DOCUMENTS

| | | | | |
|---|---|---|---|---|
| 2013/0170702 | A1* | 7/2013 | Boncyk | G06K 9/6212 382/103 |
| 2013/0287251 | A1* | 10/2013 | Mitsui | G06K 9/3241 382/103 |
| 2013/0329940 | A1* | 12/2013 | Nakamura | G06K 9/0063 382/100 |
| 2014/0333722 | A1* | 11/2014 | Kim | G06T 3/00 348/46 |
| 2015/0287192 | A1* | 10/2015 | Sasaki | A61B 5/1077 382/128 |
| 2015/0323989 | A1* | 11/2015 | Bateman | G06K 9/00308 345/156 |
| 2018/0122033 | A1* | 5/2018 | Mayuzumi | G06T 5/50 |
| 2018/0310818 | A1* | 11/2018 | Fukuhara | A61B 3/0025 |
| 2018/0310844 | A1* | 11/2018 | Tezuka | G06T 7/0016 |
| 2019/0205688 | A1* | 7/2019 | Yano | G06F 9/3004 |
| 2020/0118274 | A1* | 4/2020 | Saito | G06T 7/11 |
| 2020/0342655 | A1* | 10/2020 | Liu | G06T 17/05 |
| 2021/0064893 | A1* | 3/2021 | Yamamoto | G06K 9/00798 |

OTHER PUBLICATIONS

Takehiro Ando et al., "Accuracy Validation on the Fine Land Cover Information Classification Using Different Methods of Geoeye-1 Satellite Imagery: A Case Study of Kohoku Newtown", Reports of the City Planning Institute of Japan, The City Planning Institute of Japan, Aug. 2015, No. 14, pp. 153-157 (concise explanation of relevance set forth in the specification).

Ryosuke Nakamura et al., "Object Recognition on Earth-Observing Satellite Imagery", The 30th Annual Conference of the Japanese Society for Artificial Intelligence, 2016, The Japanese Society for Artificial Intelligence (concise explanation of relevance set forth in the specification).

English Translation of International Preliminary Report on Patentability dated Oct. 8, 2020 in corresponding International (PCT) Application No. PCT/JP2019/000619.

Extended European Search Report dated Mar. 26, 2021 in European Patent Application No. 19775373.4.

Yang Zhan et al., "Change Detection Based on Deep Siamese Convolutional Network for Optical Aerial Images", IEEE Geoscience and Remote Sensing Letters, IEEE Service Center, New York, NY, Oct. 1, 2017, vol. 14, No. 10, pp. 1845-1849.

* cited by examiner

FIG. 9

| 2 | 2 | 2 | 2 | 4 | 4 | 4 | 4 |
|---|---|---|---|---|---|---|---|
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |
| 2 | 2 | 2 | 4 | 4 | 3 | 3 | 4 |
| 2 | 2 | 2 | 1 | 1 | 3 | 3 | 3 |
| 2 | 2 | 3 | 3 | 3 | 3 | 3 | 3 |
| 2 | 2 | 3 | 3 | 3 | 3 | 3 | 3 |
| 2 | 2 | 2 | 2 | 3 | 3 | 3 | 3 |

- 300-4: Fourth Category Region
- 300-1: First Category Region
- 300-3: Third Category Region
- 300-2: Second Category Region

FIG. 10

| 2 | 2 | 2 | 2 | 4 | 4 | 4 | 4 |
|---|---|---|---|---|---|---|---|
| 2 | 2 | 2 | 2 | 4 | 4 | 4 | 4 |
| 2 | 2 | 2 | 2 | 4 | 4 | 4 | 4 |
| 2 | 2 | 2 | 2 | 4 | 4 | 4 | 4 |
| 2 | 2 | 2 | 4 | 4 | 3 | 3 | 4 |
| 2 | 2 | 2 | 3 | 3 | 3 | 3 | 3 |
| 2 | 2 | 3 | 3 | 3 | 3 | 3 | 3 |
| 2 | 2 | 3 | 3 | 3 | 3 | 3 | 3 |
| 2 | 2 | 2 | 2 | 3 | 3 | 3 | 3 |

- 300-4: Fourth Category Region
- 300-3: Third Category Region
- 300-2: Second Category Region

REGION EXTRACTION APPARATUS AND REGION EXTRACTION METHOD

TECHNICAL FIELD

The present invention relates to a region extraction apparatus and a region extraction method.

BACKGROUND ART

In recent years, extraction of change in ground such as a construction of a building on a grassland, is carried out based on satellite images and aerial images, by use of remote sensing technology. In addition, extraction of a ground object such as a car or a building is also carried out.

When extracting a change from satellite images and aerial images, change in ground cannot be extracted by comparing two images of a same point at different time by unit of pixel. This is because change between images acquired as satellite images and aerial images includes not only change of ground but also changes of reflection intensity and shadow due to difference of photographing directions, times or the like. In addition, change between images includes also differences such as defoliation of trees and snowfall.

Non-patent literature 1 discloses a method of categorizing land cover information from satellite images by use of machine learning.

In addition, non-patent literature 2 discloses a method of extracting an object by use of a categorizer acquired by machine learning.

In addition, patent literature 1 discloses a method of extracting a region of an extraction target that has changed based on aerial images photographed at a first time point and a second time point. In this method, training data is generated based on an aerial image at a first time point and map information at the first time point. A land cover that is photographed in an aerial image at a second time point is identified by use of extraction target categorizer that is learned from the generated training data. By use of this result, regions that do not include the extraction target are excluded from regions in which the aerial image at the first time point and the aerial image at the second time point are different.

CITATION LIST

Patent Literature

[Patent Literature 1] Japanese Patent Publication No. 2017-33197

Non-Patent Literature

[Non-patent Literature 1] Takehiro Ando et al., "Accuracy Validation on the Fine Land Cover Information Categorization Using Different Methods of Geoeye-1 Satellite Imagery: A Case Study of Kohoku Newtown", Reports of the City Planning Institute of Japan, The City Planning Institute of Japan, August, 2015, No. 14, pp. 153-157.
[Non-patent Literature 2] Ryosuke NAKAMURA et al., "Object recognition on Earth-observing satellite imagery", The 30th Annual Conference of the Japanese Society for Artificial Intelligence, 2016, The Japanese Society for Artificial Intelligence, 2016.

SUMMARY OF INVENTION

The difference region extraction apparatus disclosed in the Patent Literature 1 requires map information corresponding to a first time point of two time points to be compared. Since update frequency of map information is very lower than update frequency of satellite images or the like, images that can be used as the first time point are limited. As a result, a time interval appropriated to extraction target may not be set and extraction accuracy may be low.

An objective of the present invention is to provide an apparatus that extracts a region where an object has changed based on ground surface images at two arbitrary time points in order to solve above problems. Other objectives can be understood from the descriptions and explanations of Embodiments as below.

In the following, means for solving the problems will be described by use of numbers and/or symbols used in the Embodiments of the invention. Those numbers and/or symbols are added with parenthesis for reference, in order to indicate an example of correspondence relationship between descriptions in Claims and Embodiments. Therefore, interpretation of Claims is not to be limited by descriptions with parenthesis.

In order to achieve the above objective, a region extraction apparatus according to a first aspect of the present invention is provided with a candidate extraction unit, a categorization unit and a region extraction unit. The candidate extraction unit extracts a difference region where a first ground surface image of a ground photographed from above at a first time point and a second ground surface image of the ground photographed at a second time point different from the first time point are different. The categorization unit estimates a first category of a first object that is photographed in correspondence with a position in the first ground surface image and calculates a first categorization image that indicates a relationship between the position of the first object and the first category. In addition, the categorization unit estimates a second category of a second object that is photographed in correspondence with a position in the second ground surface image and calculates a second categorization image that indicates a relationship between the position of the second object and the second category. The region extraction unit extracts an extraction region, in which the first category and the second category located at a same position as the first category satisfy a predetermined condition, from the difference region. In addition, the region extraction unit generates and transmits an extraction signal including extraction region information that indicates the extraction region.

The above-mentioned predetermined condition may indicate that the first category is a predetermined first condition category and the second category is a predetermined second condition category.

The above-mentioned region extraction unit may be provided with a shape determination unit. The shape determination unit may calculate a shape characteristic of an isolation region composed of a combination of pixels that are adjacent to each other and included in the difference region. In addition, the shape determination unit may exclude the isolation region having the relevant shape characteristic from the difference region when the shape characteristic is not included in any one of at least one first shape characteristic of the first condition category or any one of at least one second shape characteristic of the second condition category.

The above-mentioned predetermine condition may indicate that any one of the first category or the second category is a predetermined third category.

The above-mentioned region extraction unit may be provided with a shape determination unit. The shape determination unit may calculate a shape characteristic of an isolation region composed of a combination of pixels that are adjacent to each other and included in the difference region. In addition, the shape determination unit may exclude the isolation region having the shape characteristic from the difference region when the shape characteristic is not included in any of at least one third shape characteristic of the third condition category.

The above-mentioned predetermined condition may indicate that the first category and the second category are different.

The above-mentioned region extraction unit may be provided with a shape determination unit. The shape determination unit may calculate a shape characteristic of an isolation region composed of a combination of pixels that are adjacent to each other and included in the difference region. In addition, the shape determination unit may exclude the isolation region having the shape characteristic from the difference region when the shape characteristic is not included in any one of at least one shape characteristic of any one of at least one category that the categorization unit can estimate.

The above-mentioned region extraction unit may be provided with a categorization decision unit. The categorization decision unit may calculate a first integration region constituted by integrating at least one region of the first category, based on an area of a first region formed of a combination of pixels that are adjacent to each other and of a same category, in a region corresponding to the difference region in the first categorization image. In addition, the categorization decision unit may calculate a second integration region constituted by integrating at least one region of the second category, based on an area of a second region formed of a combination of pixels that are adjacent to each other and of a same category, in a region corresponding to the difference region in the second categorization image. In addition, the above-mentioned region extraction unit may extract a region, in which the first category of the first integration region and the second category of the second integration region at a same position as the first category satisfy a predetermined condition, from the difference region.

The above-mentioned categorization decision unit may integrate the first region into a region of the first category that includes a pixel adjacent to the first region when an area of the first region is smaller than a predetermined threshold value in a region corresponding to the difference region in the first categorization image. In addition, the categorization decision unit may integrate the second region into a region of the second category that includes a pixel adjacent to the second region when an area of the second region is smaller than a predetermined threshold value in a region corresponding to the difference region in the second categorization image.

The above-mentioned categorization decision unit may integrate the first region into a region of the first category having a boundary line between the first region and the region of the first category that is longest among the regions of the first category adjacent to the first region. In addition, the categorization decision unit may integrate the second region into a region of the second category having a boundary line between the second region and the region of the second category that is longest among the regions of the second category adjacent to the second region.

The above-mentioned region extraction unit may be provided with a post-processing unit that combines an adjacent region adjacent to the extraction region to the extraction region based on the first category and the second category of the adjacent region.

The above-mentioned post-processing unit may combine the adjacent region to the extraction region when the first category in the adjacent region is same as the first category of the extraction region and the second category in the adjacent region is same as the second category of the extraction region.

The above-mentioned adjacent region may be a region composed of a combination of pixels that are adjacent to each other and of a same category.

The region extraction apparatus according to a second aspect of the present invention is provided with a categorization unit, a change determination unit and a candidate extraction unit. The categorization unit estimates a first category of a first object that is photographed in correspondence with a position in a first ground surface image of a ground photographed from above at a first time point and calculates a first categorization image that indicates a relationship between the position of the first object and the first category. In addition, the categorization unit estimates a second category of a second object that is photographed in correspondence with a position in a second ground surface image of the ground photographed at a second time point different from the first time point and calculates a second categorization image that indicates a relationship between the position of the second object and the second category. The change determination unit extracts a first region in which the first category and the second category located at a same position as the first category satisfy a predetermined condition. The candidate extraction unit extracts a region where the first ground surface image and the second ground surface image are different in the first region.

The region extraction method according to a third aspect of the present invention includes a candidate extraction means, a categorization means and a region extraction means that are executed by a processing device. The candidate extraction means extracts a difference region where a first ground surface image of a ground photographed from above at a first time point and a second ground surface image of the ground photographed at a second time point different from the first time point are different. The categorization means estimates a first category of a first object that is photographed in correspondence with a position in the first ground surface image and calculates a first categorization image that indicates a relationship between the position of the first object and the first category. In addition, the categorization means estimates a second category of a second object that is photographed in correspondence with a position in the second ground surface image and calculates a second categorization image that indicates a relationship between the position of the second object and the second category. The region extraction means extracts an extraction region, in which the first category and the second category located at a same position as the first category satisfy a predetermined condition, from the difference region.

A program according to a fourth aspect of the present invention includes a candidate extraction means, a categorization means and a region extraction means that are to be executed by a processing device. The candidate extraction means extracts a difference region where a first ground surface image of a ground photographed from above at a first time point and a second ground surface image of the ground photographed at a second time point different from the first time point are different. The categorization means estimates a first category of a first object that is photographed in correspondence with a position in the first ground surface image and calculates a first categorization image that indicates a relationship between the position of the first object and the first category. In addition, the categorization means estimates a second category of a second object that is photographed in correspondence with a position in the second ground surface image and calculates a second categorization image that indicates a relationship between the position of the second object and the second category. The region extraction means extracts an extraction region, in which the first category and the second category located at a same position as the first category satisfy a predetermined condition, from the difference region.

According to the present invention, a region where an object has changed can be extracted from ground surface images at two arbitrary time points.

BRIEF DESCRIPTION OF DRAWINGS

FIG. 9 is a diagram to describe the smoothing in FIG. 8.

FIG. 10 is a diagram to describe the smoothing in FIG. 8.

DESCRIPTION OF EMBODIMENTS

Embodiment 1

Figure 1:
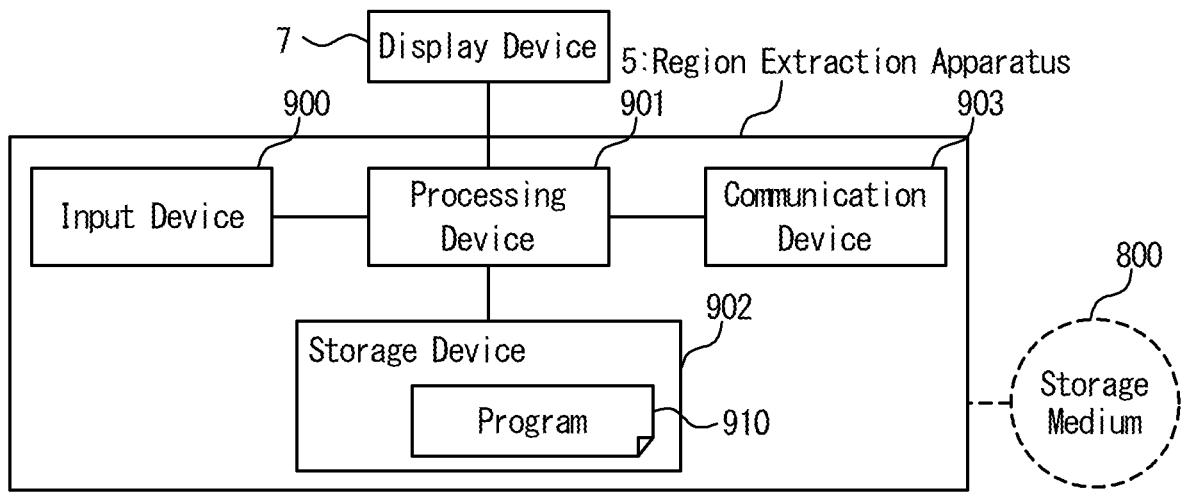
FIG. 1 is a schematic diagram of a region extraction apparatus according to an embodiment 1.

A region extraction apparatus 5 according to an embodiment 1 is provided with an input device 900, a processing device 901, a storage device 902 and a communication device 903, as shown in FIG. 1. The input device 900 is a device that includes a keyboard, a mouse, a scanner or the like and inputs data to the region extraction apparatus 5. The processing device 901 includes a Central Processing Unit (CPU), a dedicated circuit or the like and performs calculation to be processed by the region extraction apparatus 5. In addition, the processing device 901 reads out a program 910 stored in the storage device 902 and performs a process based on an instruction of the program 910. Furthermore, the processing device 901 acquires data inputted from the input device 900 and uses them in order to execute the instruction of the program 910. The storage device 902 stores several data to be used by the processing device 901. In addition, the storage device 902 stores the program 910 that shows a content of process of the processing device 901. The communication device 903 communicates with an outside of the region extraction apparatus 5 and performs transmission and reception of data necessary for the process of the processing device 901. The region extraction apparatus 5 includes a computer for example. According to an embodiment, the program 910 may be stored in an external storage medium 800, read out from the storage medium 800 and stored in the storage device 902. The storage medium 800 may be non-transitory.

In addition, the region extraction apparatus is connected to a display device 7 and outputs a result calculated by the processing device 901 to the display device 7. The display device 7 displays the outputted calculated result.

Figure 2:
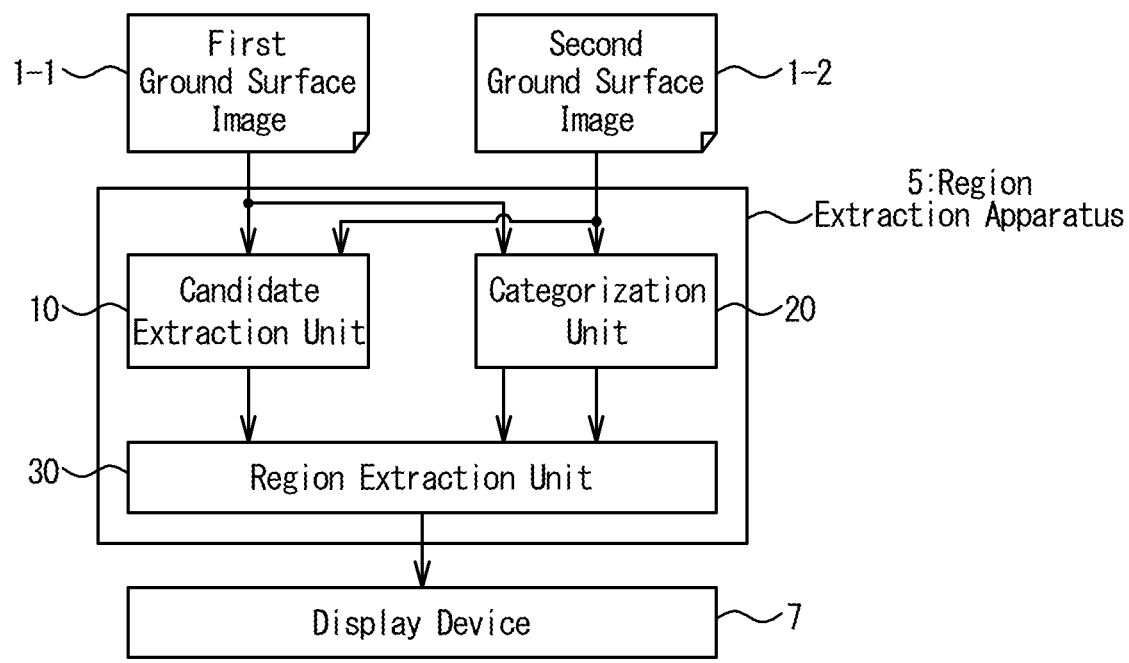
FIG. 2 is a diagram that shows a functional configuration of the region extraction apparatus in FIG. 1.

A functional configuration and an operation of the region extraction apparatus 5 will be described. The region extraction apparatus 5 is provided with a candidate extraction unit 10, a categorization unit 20 and a region extraction unit 30, as shown in FIG. 2. The region extraction apparatus 5 extracts a region where an object has changed from two ground surface images, a first ground surface image 1-1 and a second ground surface image 1-2, of a ground photographed from above. The region extraction apparatus 5 generates an extraction signal that includes extraction region information that indicates an extracted region and transmits the extraction signal to the display device 7. The display device 7 displays an image that indicates the extracted region based on the extraction signal. Herein, the first ground surface image 1-1 and the second ground surface image 1-2 will be collectively referred to as a ground surface image 1. The ground surface image 1 includes several images of the ground photographed from above such as a satellite image or an aerial image. In addition, the first ground surface image 1-1 and the second ground surface image 1-2 are images of a same ground photographed at different time points. For example, the second ground surface image 1-2 is exemplified as an image photographed at a second time point 24 hours later than a first time point when the first ground surface image 1-1 was photographed. Herein, the ground surface image 1 may be captured by a scanner or the like from the input device 900. In addition, the ground surface image 1 may be imported from the outside through the communication device 903. The processes executed by the candidate extraction unit 10, the categorization unit 20 and the region extraction unit 30 are described in the program 910 and executed by the processing device 901.

Figure 3:
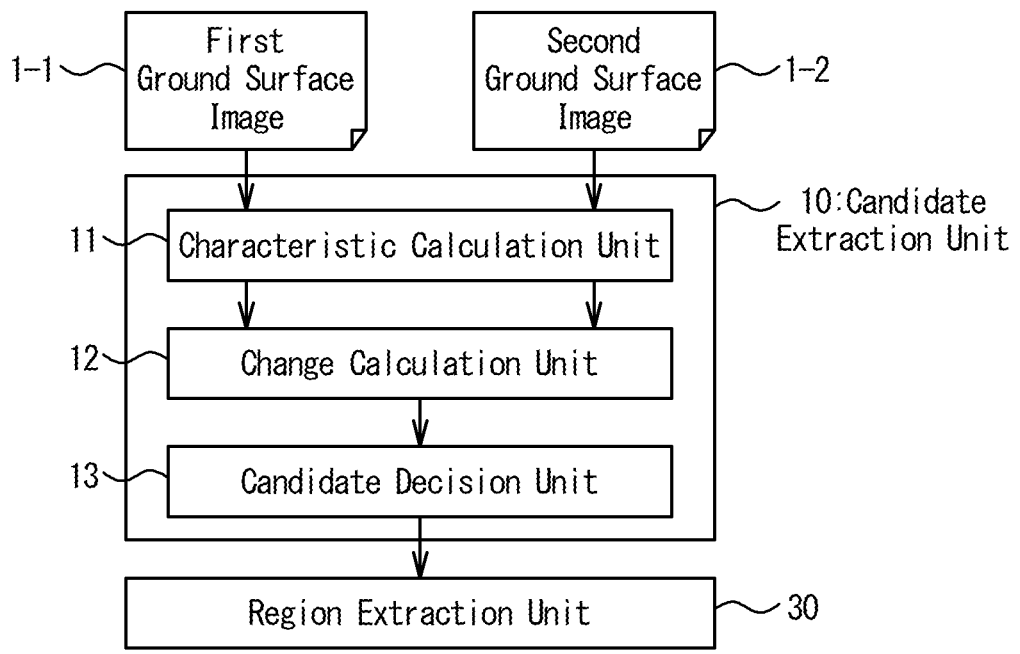
FIG. 3 is a diagram that shows a functional configuration of the candidate extraction unit in FIG. 2.

The candidate extraction unit 10 extracts a region where images have changed between the first ground surface image 1-1 and the second ground surface image 1-2, as a difference region. The candidate extraction unit 10 is provided with a characteristic calculation unit 11, a change calculation unit 12 and a candidate decision unit 13, as shown in FIG. 3.

The characteristic calculation unit 11 calculates characteristic quantity of each pixel in the ground surface image 1. The characteristic quantity is a value that indicates a characteristic of a sub-region including corresponding pixels.

The characteristic calculation unit 11 calculates, for example, information of amplitude spectrum in spatial frequency domain, in each of vertical direction and horizontal direction of a sub-region as a characteristic quantity of each pixel included in this sub-region. A method of calculation of the characteristic quantity may be selected among several calculation methods in accordance with a desired extraction target. For example, the characteristic calculation unit 11 may calculate the characteristic quantity for each of sub-regions. In addition, the characteristic quantity may be a vector quantity or a scalar quantity.

The change calculation unit 12 calculates a difference between a characteristic quantity of the first ground surface image 1-1 and a characteristic quantity of the second ground surface image 1-2 of a same position that are calculated by the characteristic calculation unit 11, as a change quantity. Specifically, a first pixel in the first ground surface image 1-1 and a second pixel in the second ground surface image 1-2 at a same position are associated. A difference between the characteristic quantity of the first pixel and the characteristic quantity of the second pixel is calculated as the change quantity. Those processes are performed for all pixels. It should be noted that, when the characteristic quantity is a vector quantity, the change quantity is a vector that indicates a difference between the characteristic quantity of the first pixel and the characteristic quantity of the second pixel.

The candidate decision unit 13 extracts pixels of which the change quantity calculated by the change calculation unit 12 satisfy a predetermined condition. When the change quantity is a scalar quantity, for example, pixels of which the change quantity is equal to or more than a predetermined threshold value are extracted. When the change quantity is a vector quantity, for example, pixels of which a length of the change quantity is equal to or more than a threshold value are extracted. In addition, a value of a component of the change quantity may be compared to a value of a component of a predetermined threshold value vector and pixels of which a specific component satisfies a predetermined condition may be extracted. For example, pixels of which a value of the change quantity of the specific component is equal to or more than the value of the threshold value vector may be extracted. In addition, pixels of which the value of the change quantity of the specific component is equal to or more than the value of the threshold value vector and a value of a change quantity of another specific component is equal to or less than the value of the threshold value vector may be extracted. The candidate decision unit 13 may have a plurality of threshold value vectors. For example, when there is a plurality of threshold value vectors, pixels of which the change quantity satisfies a condition related to at least one threshold value vector may be extracted. In addition, one threshold value vector or more may be selected in accordance with the extraction target. The candidate decision unit 13 calculates a region occupied by the extracted pixels as a difference region.

Figure 4:
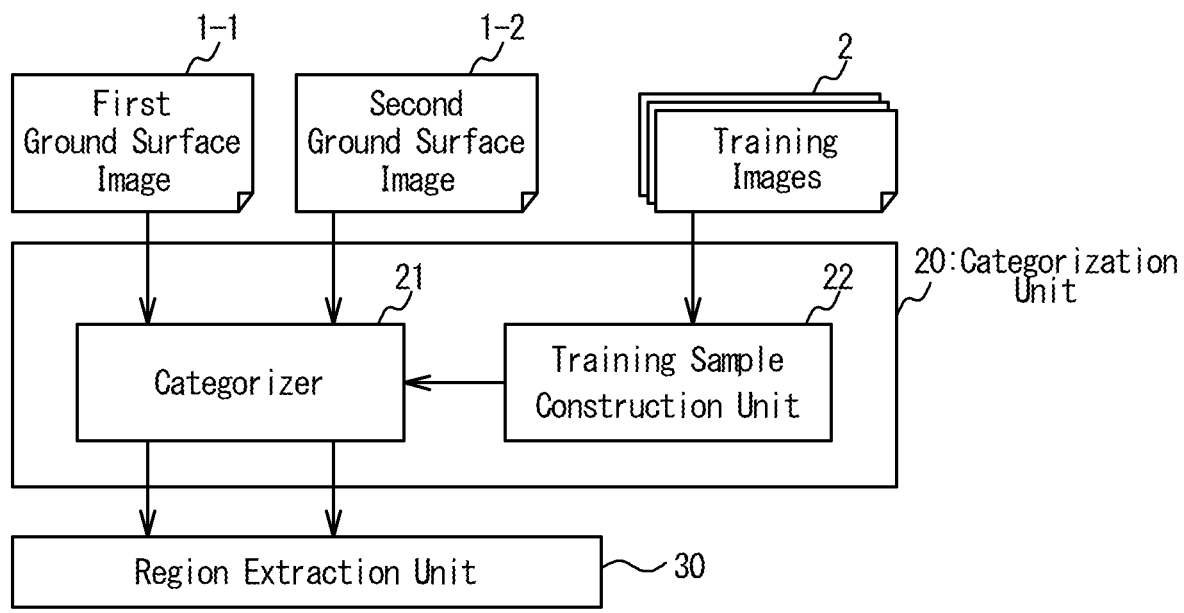
FIG. 4 is a diagram that shows a functional configuration of the categorization unit in FIG. 2.

The categorization unit 20 estimates a category to which an object photographed in the ground surface image 1 is to be categorized and generates a categorization image that indicates a relationship between a position of the object in the ground surface image 1 and the estimated category. Herein, the categorization unit 20 performs process on each of the first ground surface image 1-1 and the second ground surface image 1-2. For this reason, the categorization unit 20 generates a first categorization image based on the first ground surface image 1-1 and a second categorization image based on the second ground surface image 1-2. The categorization unit 20 is provided with a categorizer 21 and a training sample construction unit 22, as shown in FIG. 4.

The categorizer 21 learns categories of objects by use of training sample images. The categorizer 21 estimates, by use of a result of learning, a category of an object that is photographed in correspondence with a position in a ground surface image 1. The categorizer 21 generates a categorization image that indicates a relationship between the position of the object in the ground surface image 1 and the estimated category. Several methods may be selected for a learning of the categorizer 21. For example, the categorizer 21 inputs a plurality of training sample images and performs a clustering of those images. A category of each cluster may be determined based on a result of the clustering and the training sample images associated to each cluster. In addition, the learning may be performed by a deep learning. Furthermore, the categorizer 21 can categorize also a moving object such as a car that is not included in map information.

The training sample construction unit 22 constructs the training sample images for the categorizer 21 to learn based on a plurality of training images 2. The training images 2 may include a ground surface image 1 to be inputted to the region extraction apparatus 5. The training sample construction unit 22 constructs samples images adapted to a learning method of the categorizer 21. For example, in a case of performing a supervised learning by a categorizer 21, categories for categorizing and samples images adapted thereto will be constructed. Herein, the training sample images are not limited to the first ground surface images 1-1 and the second ground surface image 1-2 and various training images 2 may be used therefor. For this reason, the categorization unit 20 can categorize categories of objects even if colors, shapes or the like change due to differences of photographing direction, photographing time or the like. In addition, the categorization unit can appropriately categorize with adaptation to changes such as defoliation of trees or snowfall.

Figure 5:
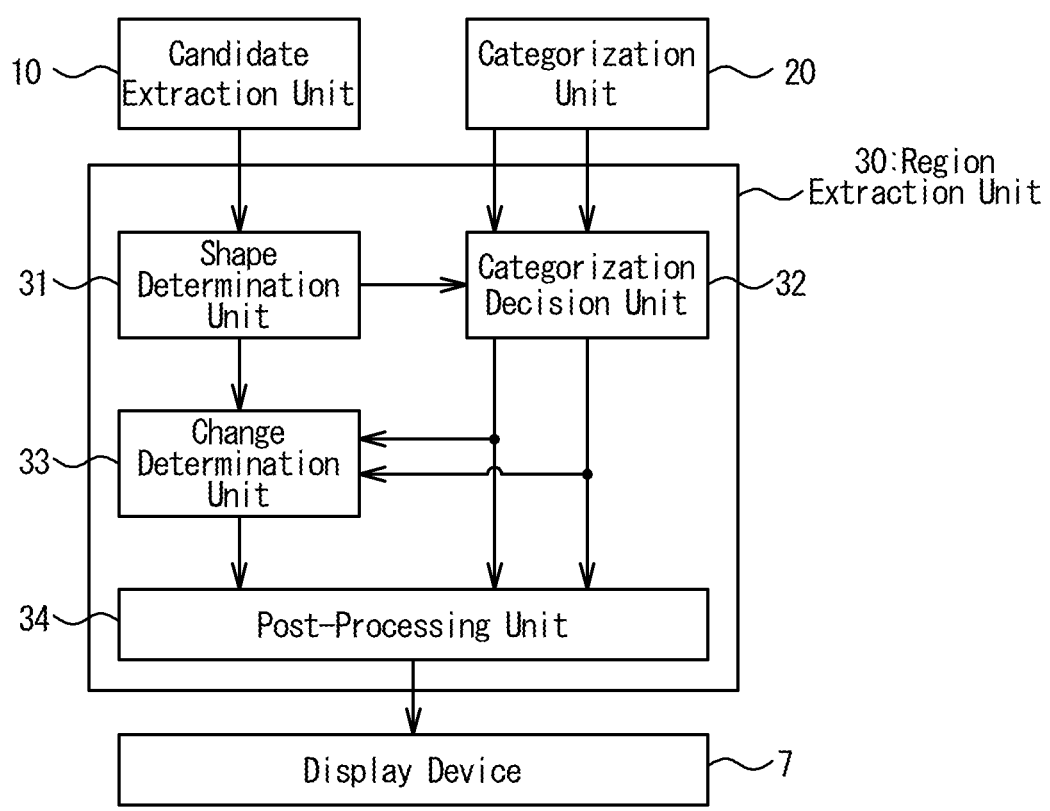
FIG. 5 is a diagram that shows a functional configuration of the region extraction unit in FIG. 2.

The region extraction unit 30 extracts a region where objects have changed based on the difference region calculated by the candidate extraction unit 10 and the categorization image generated by the categorization unit 20. The region extraction unit 30 is provided with a shape determination unit 31, a categorization decision unit 32, a change determination unit 33 and a post-processing unit 34, as shown in FIG. 5.

Figure 6:
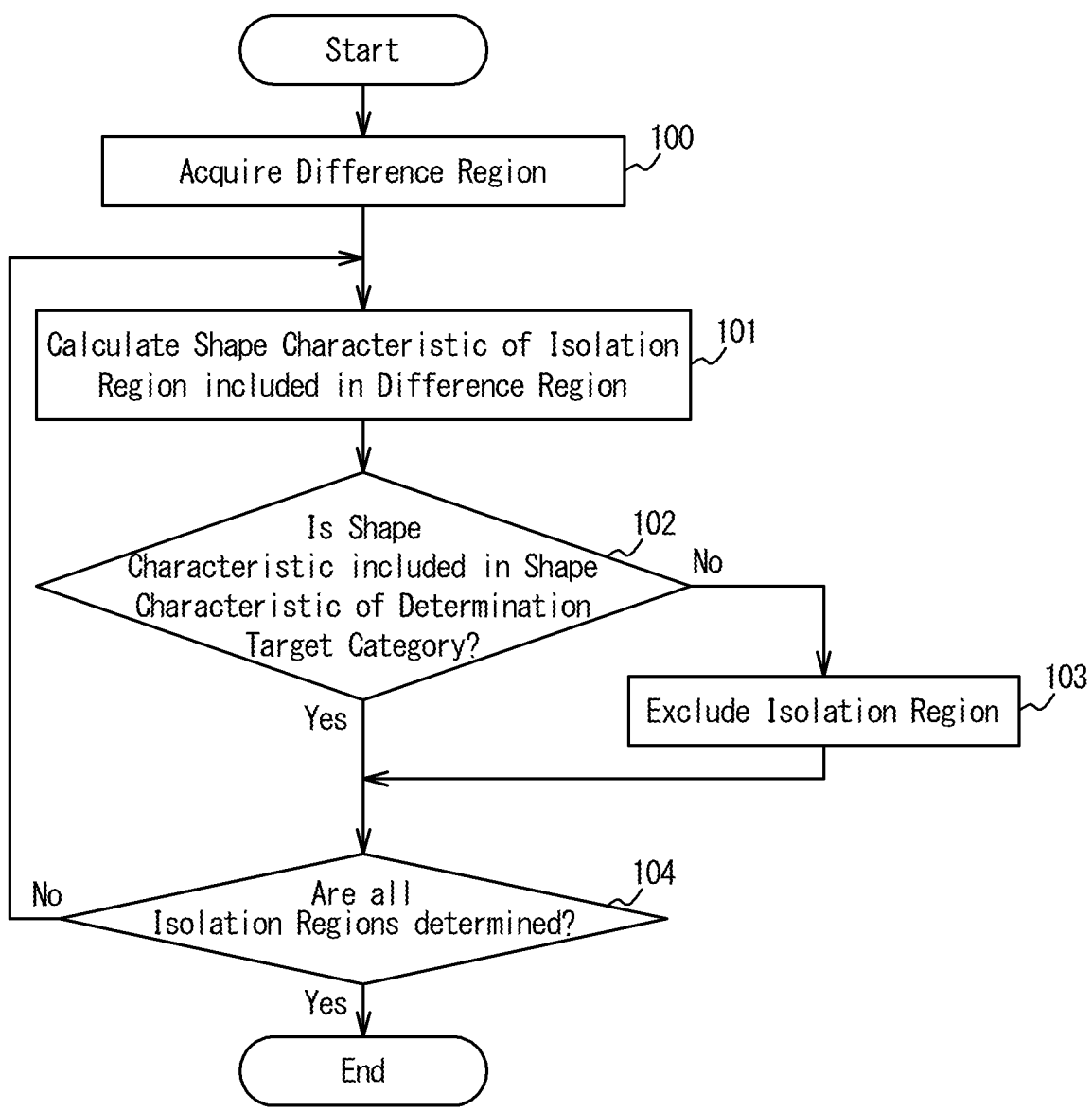
FIG. 6 is a flowchart related to processes of the shape determination unit in FIG. 5.

The shape determination unit 31 excludes a region that is not included in the category of the extraction target based on a shape of the difference region calculated by the candidate extraction unit 10. Specifically, a process shown in FIG. 6 is performed.

Figure 7:
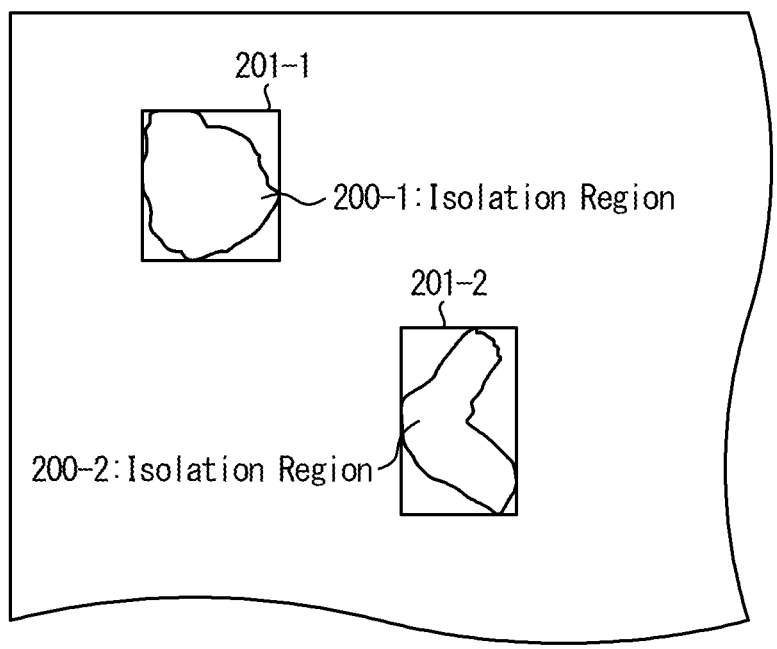
FIG. 7 is a diagram to describe the object characteristic in FIG. 6.

At a first step 100, the shape determination unit 31 acquires shape region information that indicates the difference region calculated by the candidate extraction unit 10. The difference region is a region occupied by pixels in which a difference between the characteristic quantity of the first ground surface image 1-1 and the characteristic quantity of the second ground surface image 1-2 satisfy a predetermined condition. For this reason, as shown in FIG. 7, isolation regions 200-1, 200-2, . . . , that are composed of a combination of pixels that are adjacent to each other and included in the difference region, may include a plurality of regions that are isolated from each other. The isolations regions 200-1, 200-2, . . . will be collectively referred to as an isolation region 200.

Next, at a step 101, the shape determination unit 31 calculates a shape characteristic of the isolation region 200-1 included in the difference region. Herein, the shape characteristic is a characteristic quantity acquired from a shape of the isolation region 200-1. For example, as shown in FIG. 7, the shape determination unit 31 calculates a minimal rectangle that surrounds the isolation region 200-1 as a bounding box 201-1. A shape characteristic of the isolation region 200-1 may include a long side length, a short side length, ratio of the long side length and the short side length and an area of the bounding box 201-1 that surrounds the isolation region 200-1, an area of the isolation region 200-1, a ratio of the area of the bounding box 201-1 and the area of the isolation region 200-1, or the like. In addition, the shape characteristic may be a scalar quantity of one selected among the long side length and the like. In addition, the shape characteristic may be a vector quantity based on a plurality of ones selected among the long side length and the like. The shape determination unit 31 performs similar process with a bounding box 201-2.

At a step 102, the shape determination unit determines whether the shape characteristic is included in a shape characteristic of a category of a extraction target. For example, a plurality of shape characteristics corresponding to a category of a extraction target are stored in the shape determination unit 31. The shape determination unit 31 calculates a difference between the shape characteristic acquired from the isolation region 200-1 and each of the shape characteristics stored in the shape determination unit 31. If a minimal value among the calculated differences is equal to or less than a predetermined threshold value, the shape determination unit 31 determines that the shape characteristic of the isolation region 200-1 is included in the shape characteristic of the category of the determination target. If the minimal value among the calculated differences is larger than the threshold value, the shape determination unit 31 determines that the shape characteristic of the isolation region 200-1 is not included in the shape characteristic of the category of the determination target. If the shape characteristic of the isolation region 200-1 is not included in the shape characteristic of the category of the determination target, the process moves to a step 103. If the shape characteristic of the isolation region 200-1 is included in the shape characteristic of the category of the determination target, the process moves to a step 104. In addition, when there is a plurality of categories of the determination target, the shape determination unit 31 calculates a difference between the shape characteristic of each category and the shape characteristic of the isolation region 200-1. The shape determination unit 31 compares the minimal value among the calculated differences to the threshold value to determine. The shape characteristic associated to the category of the determination target may be single. Herein, the shape characteristic of the category may be calculated based on training sample images constructed by the training sample construction unit 22 of the categorization unit 20.

Herein, for example, in a case of determining a region of which a category has changed from a category A to a category B, such as a region that has changed from a soil to a building, the category A and the category B are included in the category of the determination target. In addition, in a case of extracting a region that belongs to the category A, a region that belongs to a car for example, from any one of the first ground surface image 1-1 and the second ground surface image 1-2, the category A is included in the category of the determination target.

At the step 103, the shape determination unit 31 excludes the isolation region 200-1 from the difference region because the isolation region 200-1 is not included in the determination target. Then, the process moves to the step 104.

At the step 104, the shape determination unit 31 verifies whether the determination at the step 102 has been performed for all of the isolation regions 200. If an isolation region 200 of which the shape characteristic is not calculated is remained, the shape determination unit 31 moves to the step 101 and calculates the shape characteristic of the relevant isolation region 200. If shape characteristics of all isolation regions 200 are calculated and compared to the shape characteristic of the category of the determination target, the process of the shape determination unit 31 ends.

By doing so, the shape determination unit 31 excludes isolation regions that are not included in the category of the determination target from the difference region based on the shape of the difference region calculated by the candidate extraction unit 10.

Figure 8:
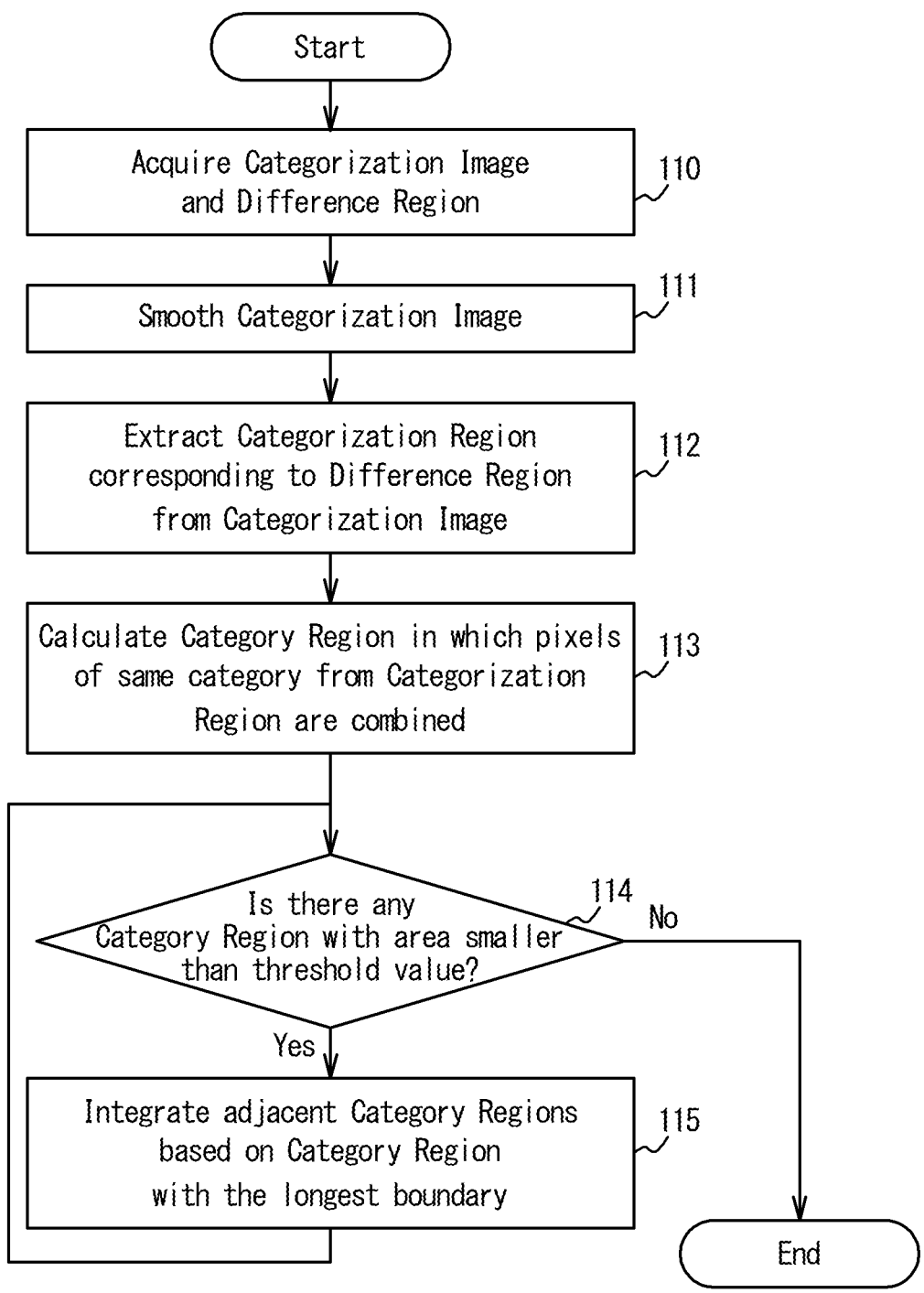
FIG. 8 is a flowchart related to processes of the categorization decision unit in FIG. 5.

The categorization decision unit 32 calculates an integration region composed of integration of regions of adjacent categories in the categorization image based on an area occupied by pixels that are adjacent to each other and of a same category. An integration region indicates the category and its position. Herein, the categorization decision unit 32 calculates a first integration region composed of an integration of regions in the first categorization image and a second integration region composed of an integration of regions in the second categorization image. Specifically, the categorization decision unit 32 performs a process in FIG. 8.

The categorization decision unit 32 acquires at a first step 110 the categorization image generated by the categorization unit 20 and a difference region information that indicates the difference region of which process by the shape determination unit 31 has ended. The categorization image is data that indicates a number of the category estimated by the categorization unit 20 at a position of the pixel, as shown in FIG. 9. In FIG. 9, a pixel with a notation "1" indicates that the pixel is estimated by the categorization unit 20 to be of a first category. Similarly, a pixel with a notation "2" indicates that it is estimated to be of a second category, a pixel with a notation "3" indicates that it is estimated to be of a third category and a pixel with a notation "4" indicates that it is estimated to be of a fourth category, respectively. That is, FIG. 9 shows that the categorization unit 20 has estimated that the ground surface image 1 includes a first category region 300-1 of the first category, a second category region 300-2 of the second category, a third category region 300-3 of the third category and the fourth category region 300-4 of the fourth category.

Next, at step 111, the categorization decision unit 32 performs a smoothing of the categorization image generated by the categorization unit 20. By doing so, the categorization decision unit 32 removes noises from the categorization image. As the smoothing, for example, when an area of a region formed by combining adjacent pixels of a same category is smaller than a predetermined threshold value, the categorization decision unit 32 changes a category of the relevant region to the category of the adjacent region, based on a number of pixels adjacent to the relevant region and of a same category to each other. In other words, the categorization decision unit 32 calculates a region occupied by pixels that are adjacent to each other and of a same category as a category region 300. When an area of the calculated category region 300 is smaller than the threshold value, the categorization decision unit 32 extracts pixels adjacent to this region and calculates a number of the extracted pixels for each category. The category of the relevant region is changed to a category of which the calculated number of pixels is the largest. Specifically, as shown in FIG. 9, the categorization image is made to include the first category region 300-1 estimated to be of the first category, the second category region 300-2 estimated to be of the second category, the third category region 300-3 estimated to be of the third category and the fourth category region 300-4 estimated to be of the fourth category, by the categorization unit 20. In this case, a number of pixels of the first category region 300-1 estimated to be of the first category is two. When the threshold value is equal to or more than three, the categorization decision unit 32 integrates the first category region 300-1 as a noise to an adjacent category region 300. Herein, a number of pixels of the second category region 300-2 adjacent to the first category region 300-1 is two. A number of pixels of the third category region 300-3 adjacent to the first category region 300-1 is six. A number of pixels of the fourth category region 300-4 adjacent to the first category region 300-1 is two. In this case, as the number of pixels of the third category region 300-3 is the largest, the categorization decision unit 32 integrates the first category region 300-1 to the third category region 300-3. As a result, as shown in FIG. 10, the categorization decision unit 32 changes the first category region 300-1 to the third category 300-3. In addition, the smoothing is not limited to this method and various methods that can remove noises may be selected instead.

Figure 11:
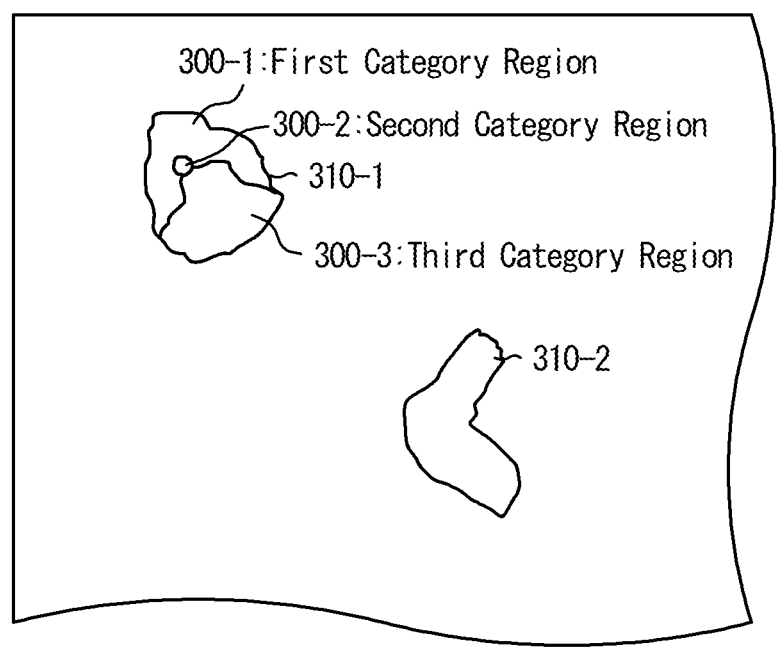
FIG. 11 is a diagram to describe the integration of category regions in FIG. 8.

Next, at step 112, the categorization decision unit 32 extracts a region corresponding to the difference region from the categorization image as categorization regions 310-1, 310-2, . . . . Herein, the categorization regions 310-1, 310-2, . . . will be collectively referred to as a categorization region 310. For example, as shown in FIG. 11, a categorization region 310-1 corresponding to the difference region is extracted. The categorization region 310 may include a plurality of isolated regions because categorization region 310 is a region corresponding to the difference region.

Next, the categorization decision unit 32 calculates a category region 300 composed of an integration of adjacent pixels of a same category in the extracted categorization region 310 (step 113). As shown in FIG. 11, the categorization decision unit 32 calculates a first category region 300-1 by integrating pixels of the first category in the categorization region 310-1. Similarly, the second category region 300-2 of the second category is calculated by integration of pixels of the second category and the third category region 300-3 is calculated by integration of pixels of the third category.

At a step 114, the categorization decision unit 32 calculates an area of the acquired category region 300 and searches for a category region 300 of which an area is smaller than a predetermined threshold value. As a result, if there is a category region 300 with an area smaller than the threshold value, the process moves to a step 115. For example, areas of the first category region 300-1, the second category region 300-2 and the third category region 300-3 in the categorization region 310-1 are calculated. It is assumed that a second category region 300-2 is acquired as a category region 300 smaller than the threshold value.

Figure 12:
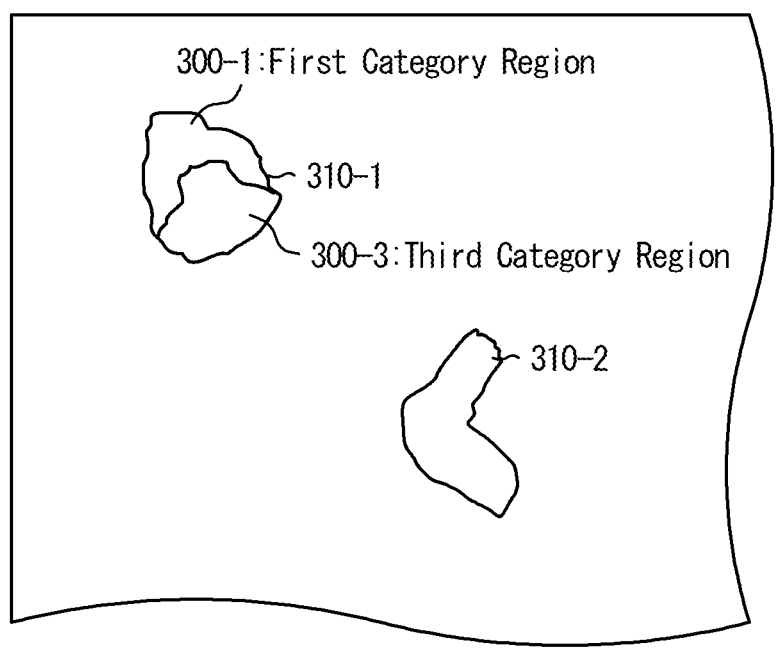
FIG. 12 is a diagram to describe the integration of category regions in FIG. 8.

Next, in the step 115, the categorization decision unit 32 integrates the searched category region 300 to an adjacent category region 300. For example, the categorization decision unit 32 integrates the relevant category region 300 to a category region 300 of which a boundary line between the category region 300 to be integrated is the longest among the adjacent category regions 300. Specifically, as shown in FIG. 11, it is assumed that the area of the second category region 300-2 is smaller than the threshold value. In this case, the categorization decision unit 32 searches a category region 300 adjacent to the second category region 300-2. As a result, the first category region 300-1 and the third category region 300-3 are extracted. A category region 300 of which a boundary line is the longest among those adjacent category regions 300 is selected. The first category region 300-1 is selected as the category region 300 having the longest boundary line between the second category region 300-2. The categorization decision unit 32 integrates the second category region 300-2 of which an area is smaller than the threshold value to the selected first category region 300-1. As a result, the categorization decision unit 32 obtains a categorization region 310-1 composed of the first category region 300-1 and the third category region 300-3, as shown in FIG. 12.

Then, the process backs to the step 114 and it is searched whether there is any category region 300 of which an area is smaller than the threshold value. If there is no category region 300 of which an area is smaller than the threshold value, the categorization decision unit 32 ends the process. For example, as shown in FIG. 12, the first category region 300-1 and the third category region 300-3 are remained in the categorization region 310-1. For this reason, the first category region 300-1 and the third category region 300-3 are included in the integration region.

As described above, the categorization decision unit 32 calculates the integration region composed of the integration of regions of the category of the categorization image based on areas of the regions formed by combination of pixels that are adjacent to each other and of a same category.

Figure 13:
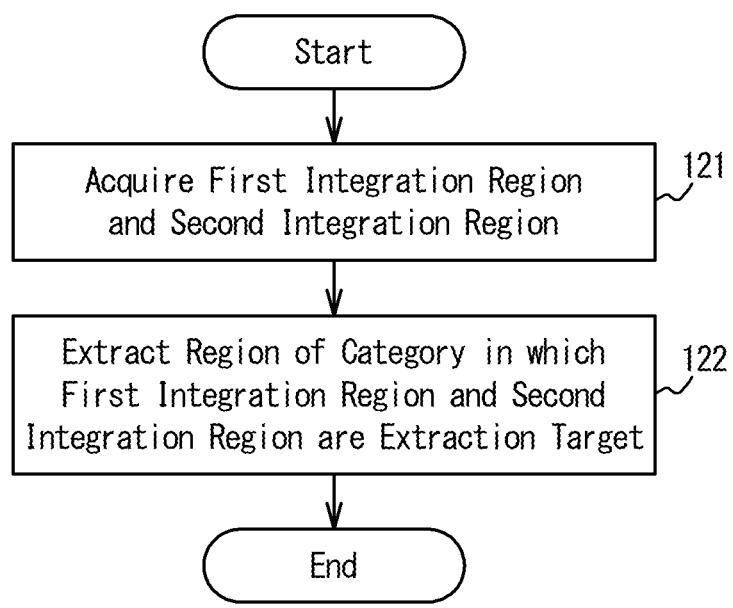
FIG. 13 is a flowchart related to processes of change determination unit in FIG. 5.

The change determination unit 33 extracts a region where an object has changed in the difference region based on the difference region calculated by the shape determination unit 31 and the integration region calculated by the categorization decision unit 32, as shown in FIG. 5. Specifically, the change determination unit 33 performs a process shown in FIG. 13.

At first, at a step 121, The change determination unit 33 acquires the first integration region and the second integration region calculated by the categorization decision unit 32. The first integration region indicates a region of the difference region integrated with the first ground surface image 1-1 based on the category of the object. The second integration region indicates a region of the difference region integrated with the first ground surface image 1-1 based on the category of the object.

Next, at a step 122, the change determination unit 33 extracts a region in which the first integration region and the second integration region are of a category of the extraction target. An example of extraction a region in which a category A has changed to a category B, for example a region in which a soil has changed to a building, will be shown. In this case, the change determination unit 33 extracts a region that belongs to the category A in the first integration region and belongs to the category B in the second integration region. The change determination unit 33 extracts a difference region corresponding to the extracted region as an extraction region 320. In other words, the change determination unit 33 extracts a region that is a second condition category in the second integration region from a region that is the first condition category in the first integration region. As described above, a region where a category of an object that is different in the first ground surface image 1-1 and the second ground surface image 1-2, that has changed from a category A to a category B, for example a region of a change from a soil to a building, can be extract. Those first and second condition categories may be categories inputted by a user to the input device 900. In addition, those categories may be predetermined categories also.

In addition, the change determination unit 33 may extract a region that belongs to the category A in any one of the first ground surface image 1-1 and the second ground surface image 1-2, for example a region that belongs to a category that indicates a car. In this case, the change determination unit 33 extracts a region that belongs to the category A in the first integration region or a region that belongs to the category A in the second integration region. The change determination unit 33 extracts the difference region corresponding to the extracted region as the extraction region 320. As described above, the change determination unit 33 can extract a region where a category of an object in any one of the first ground surface image 1-1 and the second ground surface image 1-2 that belongs to the category A.

In addition, the change determination unit 33 may switch the above described processes based on an input signal from the input device 900. In other words, the processes of the change determination unit 33 may be switched based on a content that a user inputted to the input device 900.

Figure 14:
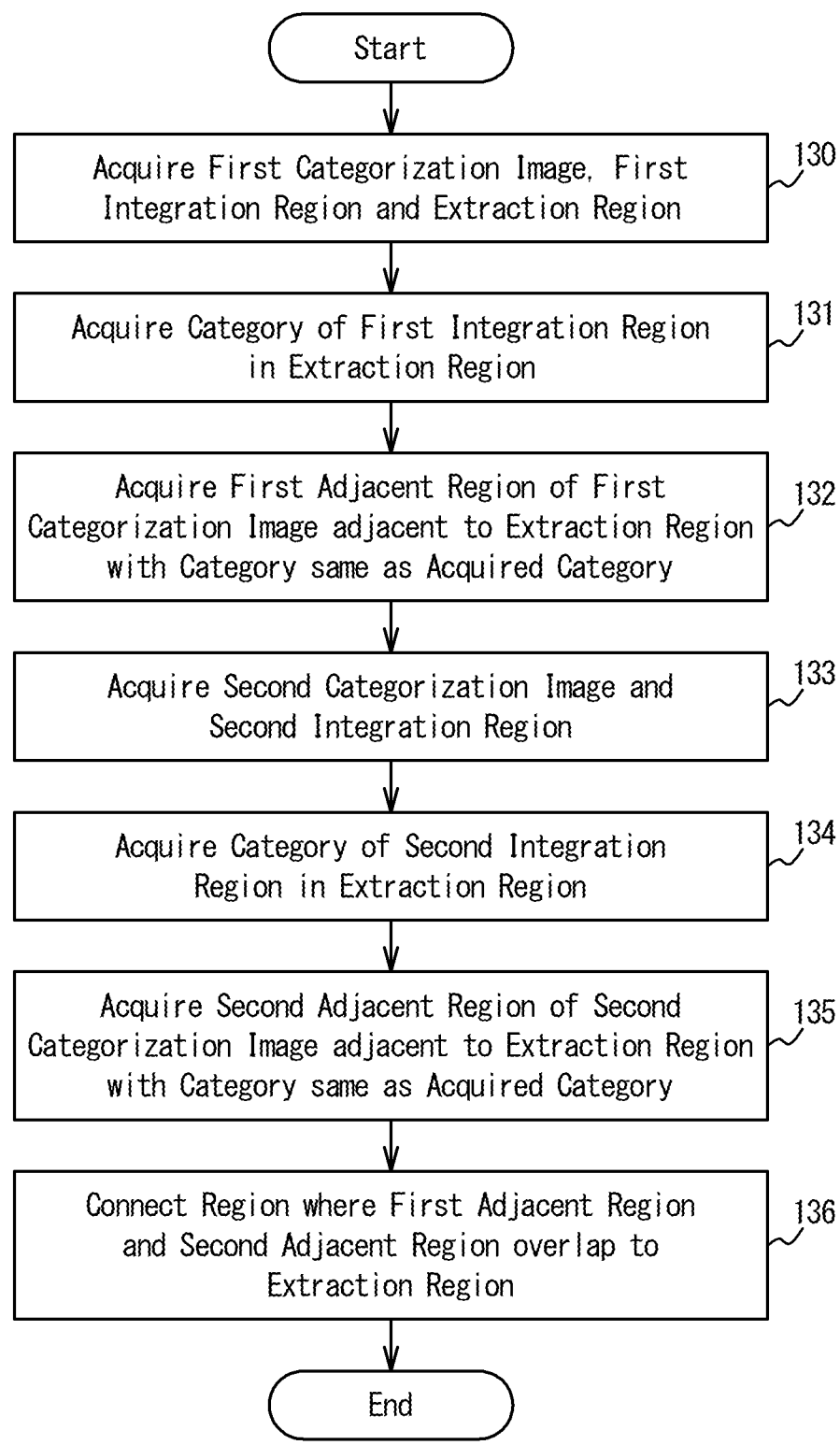
FIG. 14 is a flowchart related to processes of post-processing unit in FIG. 5.

The post-processing unit 34 combines the relevant region to the extraction region 320, in order to improve accuracy of the extraction region 320, based on a category of an adjacent region. Due to influence by a shadow or the like, a part of a region that belongs to a category of a determination target may not be extracted as a difference region. For this reason, the post-processing unit 34 combines a region that is adjacent to the extraction region 320 and of a same category to the extraction region 320. As a result, an accuracy of extracting a region improves. Specifically, the post-processing unit 34 performs processes shown in FIG. 14.

At first, at a step 130, the post-processing unit 34 acquires the first categorization image generated by the categorization unit 20, the first integration region calculated by the categorization decision unit 32 and the extraction region 320 extracted by the change determination unit 33. The first categorization image is an image of which a category of an object photographed in the first ground surface image 1-1 is estimated per unit of pixel. The first integration region indicates the category of the object calculated based on a category to which an adjacent pixel belongs in the difference region.

Figure 15:
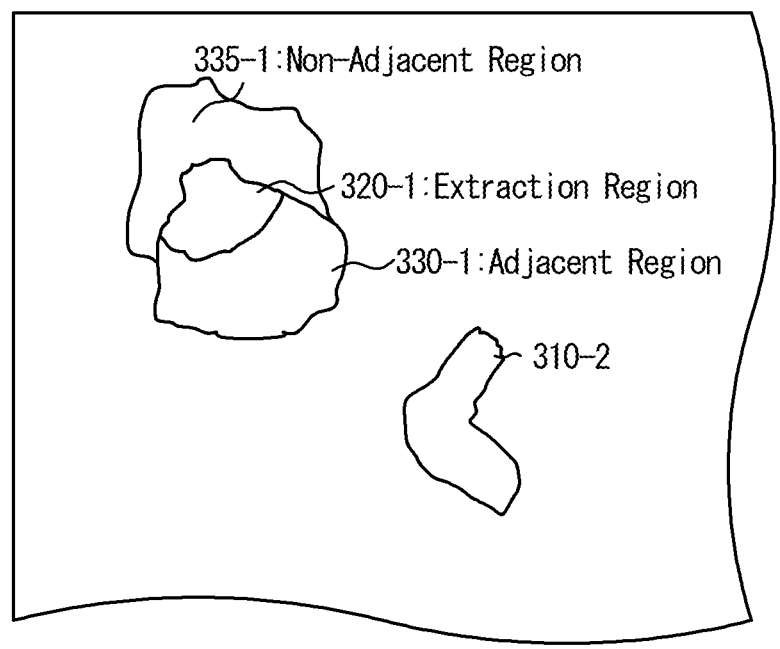
FIG. 15 is a diagram to describe the adjacent region in FIG. 14.

Next, in a step 131, the post-processing unit 34 acquires the category of the first integration region at a position corresponding to the extraction region 320. As a result, the post-processing unit 34 acquires the category of the object in the extraction region 320. Specifically, the post-processing unit 34 acquires the category of the object included in the extraction region 320-1, as shown in FIG. 15.

At a step 132, the post-processing unit 34 searches whether or not there is an adjacent region that may be combined to the extraction region 320. For this reason, the post-processing unit 34 acquires a category of a pixel adjacent to the extraction region 320 from the first categorization image. A pixel of a same category as the category corresponding to the extraction region 320 is extracted from pixels adjacent to the extraction region 320. The post-processing unit 34 calculates a first adjacent region by combining pixels that are adjacent to the extracted pixel and of a same category as the extracted pixel, in the first categorization image. For example, the post-processing unit 34 acquires an adjacent region 330-1 that indicates a same category as the extraction region 320-1, among the regions adjacent to the extraction region 320-1, as shown in FIG. 15. The adjacent region 330-1 is a region composed of a combination of pixels that are adjacent to each other and of a same category as the extraction region 320-1. On the other hand, a category of a non-adjacent region 335-1 is different from the category of the extraction region 320-1. For this reason, the non-adjacent region 335-1 is not included in a first adjacent region. As described above, the post-processing unit 34 acquires the first adjacent region corresponding to the first ground surface image 1-1.

Figure 16:
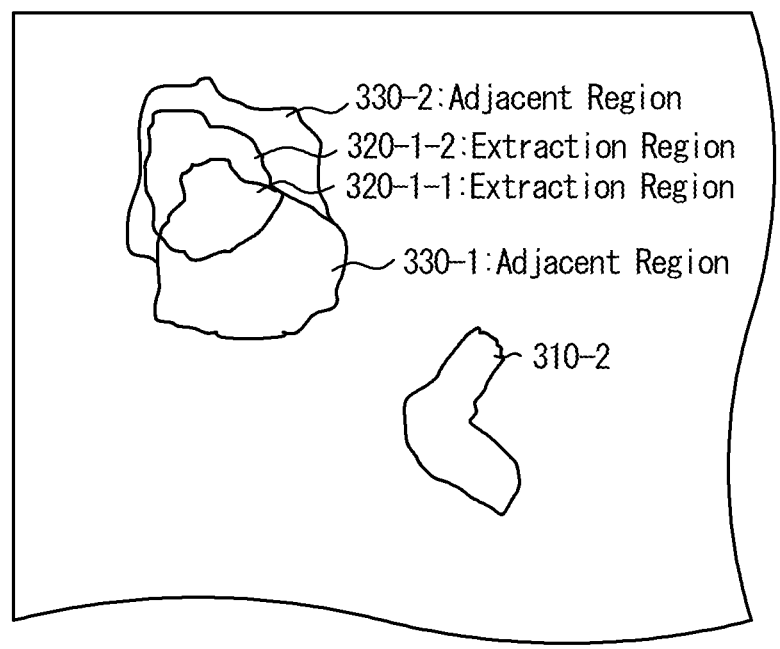
FIG. 16 is a diagram to describe the adjacent region in FIG. 14.

In addition, as shown in FIG. 16, the extraction region 320 is assumed to include an extraction region 320-1-1 and an extraction region 320-1-2. In this case, the adjacent region 330-1 is acquired as the first adjacent region because a category of the adjacent region 330-1 adjacent to the extraction region 320-1-1 is same as the category of the extraction region 320-1-1. In addition, the adjacent region 330-2 adjacent to the extraction region 320-1-2 also is acquired as the first adjacent region because the adjacent region 330-2 is of a same category as the extraction region 320-1-2. In other words, the first adjacent region includes the adjacent region 330-1 and the adjacent region 330-2.

Next, at steps 133 to 135, similarly to the steps 130 to 132, the post-processing unit 34 acquires the second adjacent region corresponding to the second ground surface image 1-2. Specifically, at the step 133, the post-processing unit 34 acquires the second categorization image generated by the categorization unit 20 and the second integration region calculated by the categorization decision unit 32.

At the step 134, the post-processing unit 34 acquires a category of the second integration region at a position corresponding to the extraction region 320. As a result, the post-processing unit 34 acquires the category of the object in the extraction region 320.

At the step 135, the post-processing unit 34 acquires pixels that are adjacent to the extraction region 320 and of a same category from the second categorization image. The post-processing unit 34 extracts pixels of a same category as the category corresponding to the extraction region 320 from the adjacent pixels. The post-processing unit 34 calculates the second adjacent region by combining pixels that are adjacent to the extracted pixel and of the same category, in the second categorization image. As described above, the post-processing unit 34 acquires the second adjacent region corresponding to the second ground surface image 1-2.

At a step 136, the post-processing unit 34 extracts a region where the first adjacent region and the second adjacent region overlap. The post-processing unit 34 combines the extracted region to the extraction region 320. In other words, when a category of a region adjacent to the extraction region 320 is same as a category of the extraction region 320 of the first integration region in the first categorization image and same as a category of the extraction region 320 of the second integration region in the second categorization image, the post-processing unit 34 combines this region to the extraction region 320. As a result, the region extraction apparatus 5 can extract, even if a part of the extraction target is not included in the difference region due to an influence such as a shadow, this part as a region of the extraction target.

In order to display the extracted extraction region 320 on the display device 7, the region extraction unit 30 generates an extraction signal including information of the extracted extraction region 320. The display device 7 displays the region that has changed between the first ground surface image 1-1 and the second ground surface image 1-2 based on the extraction signal. The user can verify the region that has changed between the first ground surface image 1-1 and the second ground surface image 1-2 and that belongs to the category of the target by watching the display device 7.

Herein, the time points of photographing the first ground surface image 1-1 and the second ground surface image 1-2 can be arbitrary selected.

As described above, the region extraction apparatus 5 performs processes of the candidate extraction unit 10, the categorization unit 20 and the region extraction unit 30 for the first ground surface image 1-1 and the second ground surface image 1-2. As a result, the extraction of a region of a category of the extraction target among regions that has changed between the first ground surface image 1-1 and the second ground surface image 1-2 can be limitedly performed. In addition, even if an object that actually belongs to the extraction target is photographed, due to an influence such as a shadow, the object may be estimated to be of category of an object different from the extraction target in the second ground surface image 1-2. In this case, by extracting a region that is the extraction target in any one of the first ground surface image 1-1 and the second ground surface image 1-2, the region extraction apparatus 5 estimates this region as the extraction target in the first ground surface image 1-1 and includes this region in the extraction region 320. In other words, by estimating the extraction target in both of the first ground surface image 1-1 and the second ground surface image 1-2, an influence such as a shadow can be suppressed. That is, a extraction accuracy of the region extraction apparatus 5 is higher than in conventional methods.

In addition, the region extraction apparatus 5 may extract a region of which a category has changed without deciding the category of the extraction target. In this case, the process is performed with a target of all categories that can be obtained from training sample images as a extraction target. For example, when comparing a shape characteristic of a category of the extraction target and a shape characteristic of the isolation region 200 (step 102 in FIG. 6), the shape determining unit 31 compares shape characteristic of all categories and the shape characteristic of the isolation region 200. In addition, the change determination unit 33 extracts a region that belongs to different categories in the first integration region and the second integration region (step 122 in FIG. 13). As a result, the region extraction apparatus 5 extracts a region where the category has changed.

In addition, the post-processing unit 34 may further calculate a likelihood of the change in the extraction region 320, based on the difference of characteristic quantities calculated by the change calculation unit 12 and the first and second integration regions calculated by the categorization decision unit 32. In this case, the region extraction apparatus 5 may add the calculated likelihood to the extraction signal. As a result, the display device 7 can display the extraction region 320 together with the likelihood. In this case, the user can verify changes of objects in order from a region with a higher likelihood and a work efficiency improves. In addition, if the calculated likelihood is smaller than a predetermined threshold value, a region of the relevant likelihood may be excluded from the extraction region 320. As a result, the display device 7 only displays region with high likelihood. The post-processing unit 34 may skip the process shown in FIG. 14 and only execute likelihood calculation processes.

In addition, the categorization unit 20 may acquire the difference region calculated by the candidate extraction unit 10 and calculate the first and second categorization images corresponding to the difference region. As a result, a time required to the process by the categorization unit 20 can be reduced. In addition, in this case, since the category of the object of only a range of the difference region is calculated, the process by the post-processing unit 34 of combining the adjacent category regions 300, specifically the process shown in FIG. 14, may be omitted.

In addition, the training sample construction unit 22 constructs training sample images that the categorizer 21 learns. For this reason, if the categorizer 21 has already learned, the categorization unit 20 may not be provided with a training sample construction unit 22. In this case, the learned categorizer 21 may be inputted by a user by use of the input device 900. In addition, the learned categorizer 21 may be acquired from outside through the communication device 903.

Figure 17:
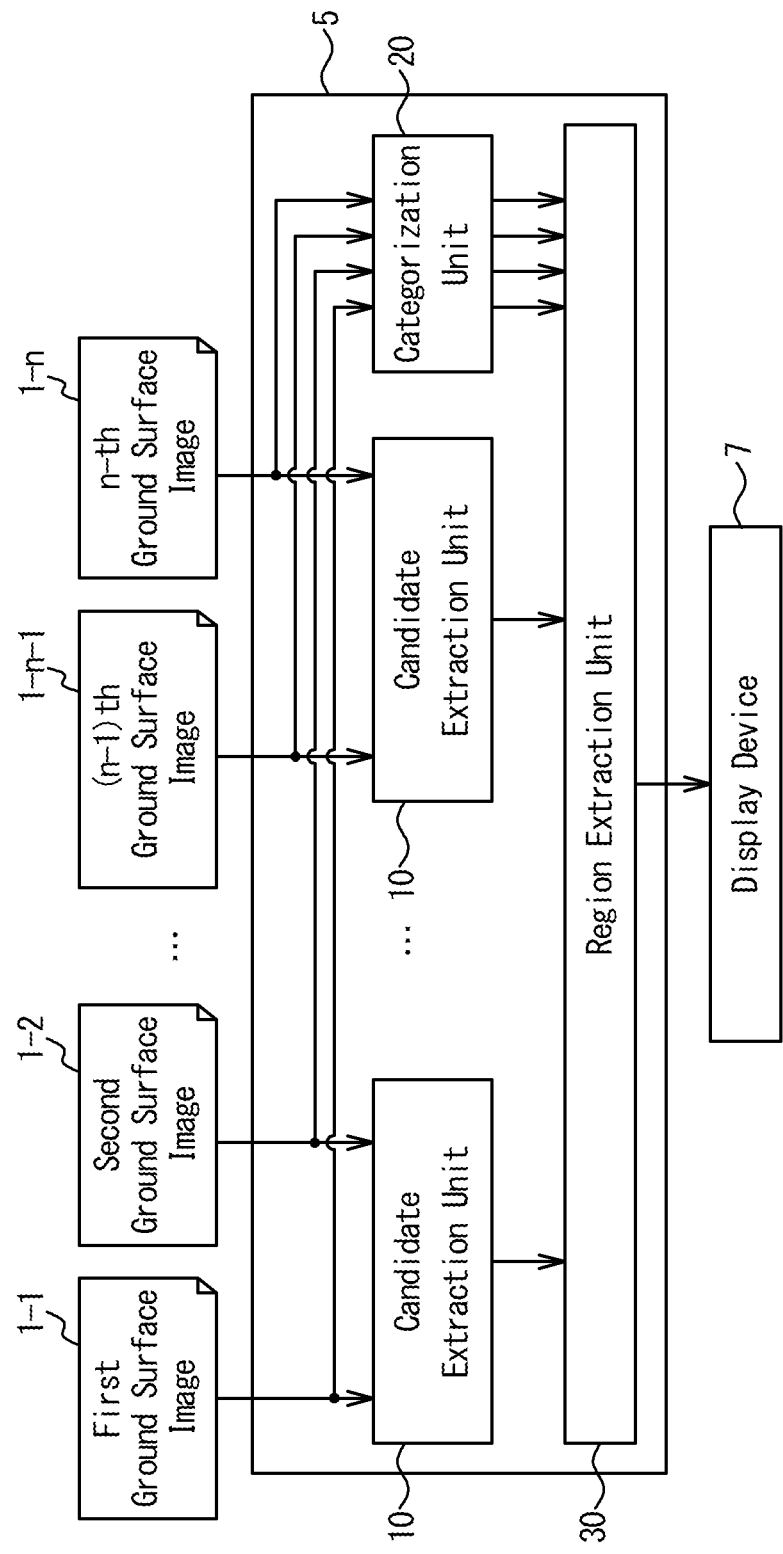
FIG. 17 is a diagram that shows a functional configuration of the region extraction apparatus that can input a plurality of ground surface images.

In addition, as shown in FIG. 17, the region extraction apparatus 5 may use a plurality of ground surface images 1 photographed at time points that are different from each other in order to calculate a difference region in the first ground surface image 1-1 and the second ground surface image 1-2. The candidate extraction unit 10 extracts the difference region from two among the plurality of ground surface images 1 including the first ground surface image 1-1 and the second ground surface image 1-2. In addition, the categorization unit 20 generates categorization images related to the plurality of ground surface images 1 including the first ground surface image 1-1 and the second ground surface image 1-2. The region extraction unit 30 extracts, based on the plurality of difference regions calculated by the candidate extraction unit 10 and the plurality of categorization images generated by the categorization unit 20, a region that belongs to the category of the extraction target from the difference regions. For example, a region calculated as a difference region in a pair of time points as a target may not be calculated as a difference region in another pair of time points. As it can be judged that this region has been extracted due to a change such as a shadow, the region extraction unit 30 may exclude this region from the difference regions. As a result, erroneous extractions are suppressed. Furthermore, as a plurality of ground surface images 1 are used, the region extraction apparatus 5 can extract a region where an object has changed based on an order of photographing the ground surface images 1 and changes between them. In addition, in a case of extracting a moving object that moves on a specific object such as a car, a plurality of ground surface images 1 are used and regions of objects such as a road or a parking where moving objects move are extracted. Then, a region where an object has changed in regions of an object where a moving object moves can be extracted from ground surface images 1 before and after the time point of the extraction target.

Embodiment 2

In the Embodiment 2, it will be described an example of limiting a range of a calculation of a characteristic quantity by a candidate extraction unit 10 based on a first categorization image and a second categorization image calculated by a categorization unit 20. In this case, process time of the candidate extraction unit 10 can be shortened.

A region extraction apparatus 5 according to the Embodiment 2 has a hardware configuration similar to the Embodiment 1 and is provided with an input device 900, a processing device 901, a storage device 902 and a communication device 903.

Figure 18:
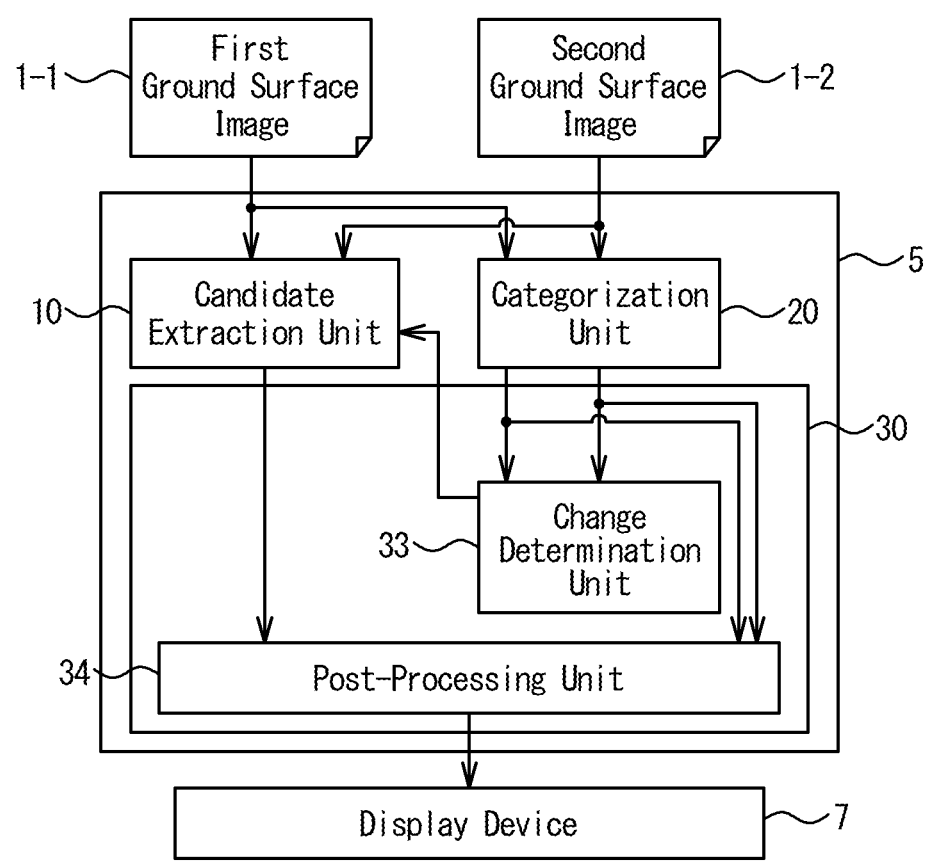
FIG. 18 is a diagram that shows a functional configuration of a region extraction apparatus according to an embodiment 2.

A functional configuration and operation of the region extraction apparatus 5 will be described. The region extraction apparatus 5 is provided with a candidate extraction unit 10, a categorization unit 20 and a region extraction unit 30, as shown in FIG. 18. The categorization unit 20 operates similarly to the Embodiment 1.

The region extraction unit 30 is provided with a change determination unit 33 and a post-processing unit 34. The change determination unit 33 extracts a region that belongs to a category of a extraction target from the first categorization image and the second categorization image generated by the categorization unit 20. Specifically, the change determination unit 33 acquires the first categorization image and the second categorization image generated by the categorization unit 20. The change determination unit 33 performs a smoothing of the first categorization image and the second categorization image that are acquired and removes noises. A region that belongs to a category of the extraction target is extracted from the first categorization image and the second categorization image from which noises are removed. For example, in a case of extracting a region changing from a category A to a category B, a region that belongs to the category A in the first ground surface image and that belongs to the category B in the second ground surface image is extracted. In addition, the change determination unit 33 may extract a region that belongs to the category A in the first categorization image or a region that belongs to the category A in the second categorization image. In addition, the change determination unit 33 may extract a region that belongs to different categories in the first categorization image and the second categorization image.

The candidate extraction unit 10 calculates a region where an image thereof changed between the first ground surface image 1-1 and the second ground surface image 1-2, in the region extracted by the change determination unit 33. Specifically, the candidate extraction unit 10 calculates characteristic quantities of the first ground surface image 1-1 and the second ground surface image 1-2 in the region extracted by the change determination unit 33. Next, the candidate extraction unit 10 calculates a difference between the characteristic quantity of the first ground surface image 1-1 and the characteristic quantity of the second ground surface image 1-2 as a change quantity. The candidate extraction unit 10 extracts a region of which the calculated change quantity is larger than a predetermined threshold value. This region that is extracted corresponds to the region of which an image is different in the first ground surface image 1-1 and the second ground surface image 1-2. As described above, processes similar to the Embodiment 1 is performed to the region extracted by the change determination unit 33.

The post-processing unit 34 of the present embodiment performs processes similarly to the post-processing unit 34 of the Embodiment 1 by using the region extracted by the candidate extraction unit 10 of the present embodiment as an extraction region 320 of the Embodiment 1, by using the first categorization image of the present embodiment as the first categorization image and the first integration region of the Embodiment 1 and by using the second categorization image of the present embodiment as the second categorization image and the second integration region of the Embodiment 1. As a result, regions adjacent to the region extracted by the candidate extraction unit 10 can be combined.

The region extraction unit 30 generates an extraction signal including information that indicates regions combined by the post-processing unit 34. The display device 7 displays a region of change between the first ground surface image 1-1 and the second ground surface image 1-2 based on the extraction signal, similarly to the Embodiment 1.

The region extraction unit 30 may be provided with a shape determination unit 31 having a function similar to the Embodiment 1. In this case, the shape determination unit 31 acquires the region extracted by the candidate extraction unit 10. The shape determination unit calculates a shape characteristic of this region and determines whether the calculated shape characteristic is included in a shape characteristic of the category of the extraction target. The shape determination unit 31 excludes a region of which the shape characteristic is determined not to be included in the shape characteristic of the category of the extraction target from the region extracted by the candidate extraction unit 10. The post-processing unit 34 acquires the region processed by the shape determination unit 31 and combines regions adjacent to the acquired region. As a result, erroneous extraction can be suppressed.

Although the above described embodiment shows an example in which the region extraction unit 30 transmits the extraction signal to the display device 7, this is not restrictive. The region extraction unit 30 may transmit the extraction signal to another device. The other device receives the extraction signal and performs processes based on the extraction region 320. In this case, the extraction signal may be transmitted from the communication device 903.

Although the above described embodiment shows an example in which the shape determination unit 31 has a plurality of shape characteristics corresponding to the category of the extraction target, this is not restrictive. It is just needed to judge whether the shape characteristic of the isolation region 200 is included in the shape characteristic of the category of the extraction target and for example a range of the shape characteristic of the category of the extraction target may be specified. In this case, if the shape characteristic of the isolation region 200 exists in the range of the shape characteristic of the category of the extraction target, it is judged that the isolation region 200 includes the category of the extraction target.

In addition, it is obvious that a region extraction method provided with means to realize each function of the region extraction apparatus 5 can extract a region where an object has changed based on the first ground surface image 1-1 and the second ground surface image 1-2. In other words, the region extraction method includes a candidate extraction means that executes functions of the candidate extraction unit 10, a categorization means that executes functions of the categorization unit 20 and a region extraction means that executes functions of the region extraction unit 30. In addition, the candidate extraction means may include a characteristic calculation means that executes functions of the characteristic calculation unit 11, a change calculation means that executes functions of the change calculation unit 12 and a candidate decision means that executes functions of the candidate decision unit 13. The region extraction means may include a shape determination means that executes functions of the shape determination unit 31, a categorization decision means that executes functions of the categorization decision unit 32, a change determination means that executes functions of the change determination unit 33 and a post-processing means that executes functions of the post-processing unit 34.

In addition, the program 910 may include a program that makes a computer to execute this region extraction method.

The present invention is not limited by each of the above described embodiments and it is obvious that each embodiment may be appropriately deformed or modified within a scope of technical spirit of the present invention. Technologies in each embodiment can be used in other embodiment unless technical inconsistencies arise. In particular, above described processes are one example and order of each step and content of processes may be changed as long as functions are not hindered. In addition, the described configuration may be arbitrary changed as long as the functions are not hindered. For example, the categorization unit 20 may be provided with the change determination unit 33 in the Embodiment 2. In addition, the smoothing of the categorization image that is performed by the categorization decision unit 32 may be carried out by the categorization unit 20. In addition, the processes of the post-processing unit 34 may be omitted. Furthermore, the processes of the shape determination unit 31 may be omitted. The processes of the categorization decision unit 32 may be omitted.

It should be noted that the present application claims priority based on Japanese patent application No. 2018-057894 filed on Mar. 26, 2018 and incorporates herein all disclosure thereof by reference.

The invention claimed is:

1. A region extraction apparatus comprising:
a candidate extraction unit configured to extract a difference region where a first ground surface image of a ground photographed from above at a first time point and a second ground surface image of the ground photographed at a second time point different from the first time point are different;
a categorization unit configured to estimate a first category of a first object that is photographed in correspondence with a position in the first ground surface image, calculate a first categorization image that indicates a relationship between the position of the first object and the first category, estimate a second category of a second object that is photographed in correspondence with a position in the second ground surface image, and calculate a second categorization image that indicates a relationship between the position of the second object and the second category; and
a region extraction unit configured to extract an extraction region, in which the first category and the second category located at a same position as the first category satisfy a predetermined condition, from the difference region, and generate and transmit an extraction signal including extraction region information that indicates the extraction region.

2. The region extraction apparatus according to claim 1, wherein the predetermined condition indicates that the first category is a predetermined first condition category and the second category is a predetermined second condition category.

3. The region extraction apparatus according to claim 2, wherein the region extraction unit comprises a shape determination unit configured to:
calculate a shape characteristic of an isolation region composed of a combination of pixels that are adjacent to each other and included in the difference region; and
exclude the isolation region having the shape characteristic from the difference region when the shape characteristic is not included in any one of at least one first shape characteristic of the first condition category or any one of at least one second shape characteristic of the second condition category.

4. The region extraction apparatus according to claim 1, wherein the predetermined condition indicates that any one of the first category or the second category is a predetermined third condition category.

5. The region extraction apparatus according to claim 4, wherein the region extraction unit comprises a shape determination unit configured to:
calculate a shape characteristic of an isolation region composed of a combination of pixels that are adjacent to each other and included in the difference region; and
exclude the isolation region having the shape characteristic from the difference region when the shape characteristic is not included in any of at least one third shape characteristic of the third condition category.

6. The region extraction apparatus according to claim 1, wherein the predetermined condition indicates that the first category and the second category are different.

7. The region extraction apparatus according to claim 6, wherein the region extraction unit comprises a shape determination unit configured to:
calculate a shape characteristic of an isolation region composed of a combination of pixels that are adjacent to each other and included in the difference region; and
exclude the isolation region having the shape characteristic from the difference region when the shape characteristic is not included in any of at least one shape characteristic of any of at least one category that the categorization unit can estimate.

8. The region extraction apparatus according to claim 1, wherein the region extraction unit comprises a categorization decision unit configured to:
calculate a first integration region constituted by integrating at least one region of the first category, based on an area of a first region formed of a combination of pixels that are adjacent to each other and of a same category, in a region corresponding to the difference region in the first categorization image;
decide a category of the first integration region;
calculate a second integration region constituted by integrating at least one region of the second category, based on an area of a second region formed of a combination of pixels that are adjacent to each other and of a same category, in a region corresponding to the difference region in the second categorization image; and
decide a category of the second integration region, and
wherein the region extraction unit extracts a region, in which the first category of the first integration region and the second category of the second integration region at a same position as the first category satisfy a predetermined condition, from the difference region.

9. The region extraction apparatus according to claim 8, wherein the categorization decision unit is configured to:
integrate the first region into a region of the first category that includes a pixel adjacent to the first region when an area of the first region is smaller than a predetermined threshold value in a region corresponding to the difference region in the first categorization image;
decide a category of the first region same as the region of the first category;
integrate the second region into a region of the second category that includes a pixel adjacent to the second region when an area of the second region is smaller than a predetermined threshold value in a region corresponding to the difference region in the second categorization image; and
decide a category of the second region same as the region of the second category.

10. The region extraction apparatus according to claim 9, wherein the categorization decision unit is configured to:
integrate the first region into a region of the first category having a boundary line between the first region that is longest among the regions of the first category adjacent to the first region; and integrate the second region into a region of the second category having a boundary line between the second region that is longest among the regions of the second category adjacent to the second region.

11. The region extraction apparatus according to claim 1, wherein the region extraction unit comprises a post-processing unit configured to combine an adjacent region adjacent to the extraction region to the extraction region based on the first category and the second category of the adjacent region.

12. The region extraction apparatus according to claim 11, wherein the post-processing unit is configured to combine the adjacent region to the extraction region when the first category in the adjacent region is same as the first category of the extraction region and the second category in the adjacent region is same as the second category of the extraction region.

13. The region extraction apparatus according to claim 12, wherein the adjacent region is a region composed of a combination of pixels of a same category adjacent to each other.

14. A region extraction apparatus comprising:
a categorization unit configured to estimate a first category of a first object that is photographed in correspondence with a position in a first ground surface image of a ground photographed from above at a first time point, calculate a first categorization image that indicates a relationship between the position of the first object and the first category, estimate a second category of a second object that is photographed in correspondence with a position in a second ground surface image of the ground photographed at a second time point different from the first time point, and calculate a second categorization image that indicates a relationship between the position of the second object and the second category;
a change determination unit configured to extract a first region in which the first category and the second category located at a same position as the first category satisfy a predetermined condition;
a candidate extraction unit configured to extract a region of the first region where the first ground surface image and the second ground surface image are different; and
a region extraction unit configured to generate and transmit an extraction signal including extraction region information that indicates the extracted region.

15. A region extraction method including:
extracting, by a processing device, a difference region where a first ground surface image of a ground photographed from above at a first time point and a second ground surface image of the ground photographed at a second time point different from the first time point are different;
estimating, by a processing device, a first category of a first object that is photographed in correspondence with a position in the first ground surface image, calculate a first categorization image that indicates a relationship between the position of the first object and the first category, estimate a second category of a second object that is photographed in correspondence with a position in the second ground surface image, and calculate a second categorization image that indicates a relationship between the position of the second object and the second category;
extracting, by a processing device, an extraction region, in which the first category and the second category located at a same position as the first category satisfy a predetermined condition, from the difference region; and
generating and transmitting an extraction signal including extraction region information that indicates the extraction region.

16. A non-transitory storage medium storing a program to make a processing unit to execute:
a candidate extraction means configured to extract a difference region where a first ground surface image of a ground photographed from above at a first time point and a second ground surface image of the ground photographed at a second time point different from the first time point are different;
a categorization means configured to estimate a first category of a first object that is photographed in correspondence with a position in the first ground surface image, calculate a first categorization image that indicates a relationship between the position of the first object and the first category, estimate a second category of a second object that is photographed in correspondence with a position in the second ground surface image, and calculate a second categorization image that indicates a relationship between the position of the second object and the second category; and
a region extraction means configured to extract an extraction region, in which the first category and the second category located at a same position as the first category satisfy a predetermined condition, from the difference region, and generate and transmit an extraction signal including extraction region information that indicates the extraction region.

* * * * *